US012584996B2

(12) United States Patent
Addison et al.

(10) Patent No.: US 12,584,996 B2
(45) Date of Patent: Mar. 24, 2026

(54) HARDWARE GENERATION OF 3D DMA CONFIGURATIONS

(71) Applicant: Infineon Technologies AG, Neubiberg (DE)

(72) Inventors: David Addison, Bristol (GB); Dyson Wilkes, Marlborough (GB); Markus Bichl, Feldkirchen-Westerham (DE); Sandeep Vangipuram, Bristol (GB)

(73) Assignee: Infineon Technologies AG, Neubiberg (DE)

( * ) Notice: Subject to any disclaimer, the term of this patent is extended or adjusted under 35 U.S.C. 154(b) by 303 days.

(21) Appl. No.: 18/183,263

(22) Filed: Mar. 14, 2023

(65) Prior Publication Data

US 2024/0310481 A1 Sep. 19, 2024

(51) Int. Cl.
*G01S 7/35* (2006.01)
*G01S 13/58* (2006.01)

(52) U.S. Cl.
CPC ............ *G01S 7/356* (2021.05); *G01S 13/584* (2013.01)

(58) Field of Classification Search
CPC ............................... G01S 7/356; G01S 13/584
See application file for complete search history.

(56) References Cited

U.S. PATENT DOCUMENTS

| | | | |
|---|---|---|---|
| 2017/0329702 A1* | 11/2017 | Gruenewald ........... | G01S 13/28 |
| 2021/0096210 A1* | 4/2021 | Maher ................... | G06F 3/0661 |
| 2021/0389777 A1* | 12/2021 | Cho ....................... | B60W 10/04 |

* cited by examiner

*Primary Examiner* — Robert W Hodge
*Assistant Examiner* — Brandon James Henson
(74) *Attorney, Agent, or Firm* — Eschweiler & Potashnik, LLC

(57) ABSTRACT

A baseband processor including a fast Fourier transform (FFT) circuit having an FFT input and an FFT output. A first processing path having a first processing path input and a first processing path output. The first processing path including a memory coupled to the FFT output and the first processing path input via a first bus. A Direct Memory Access (DMA) coupled between the memory and the first processing path output. The DMA coupled to the memory via a second bus. A second processing path arranged in parallel with the first processing path. The second processing path including a detection circuit having a detection circuit input coupled to the FFT output and having a detection circuit output coupled to the DMA.

15 Claims, 5 Drawing Sheets

300

300

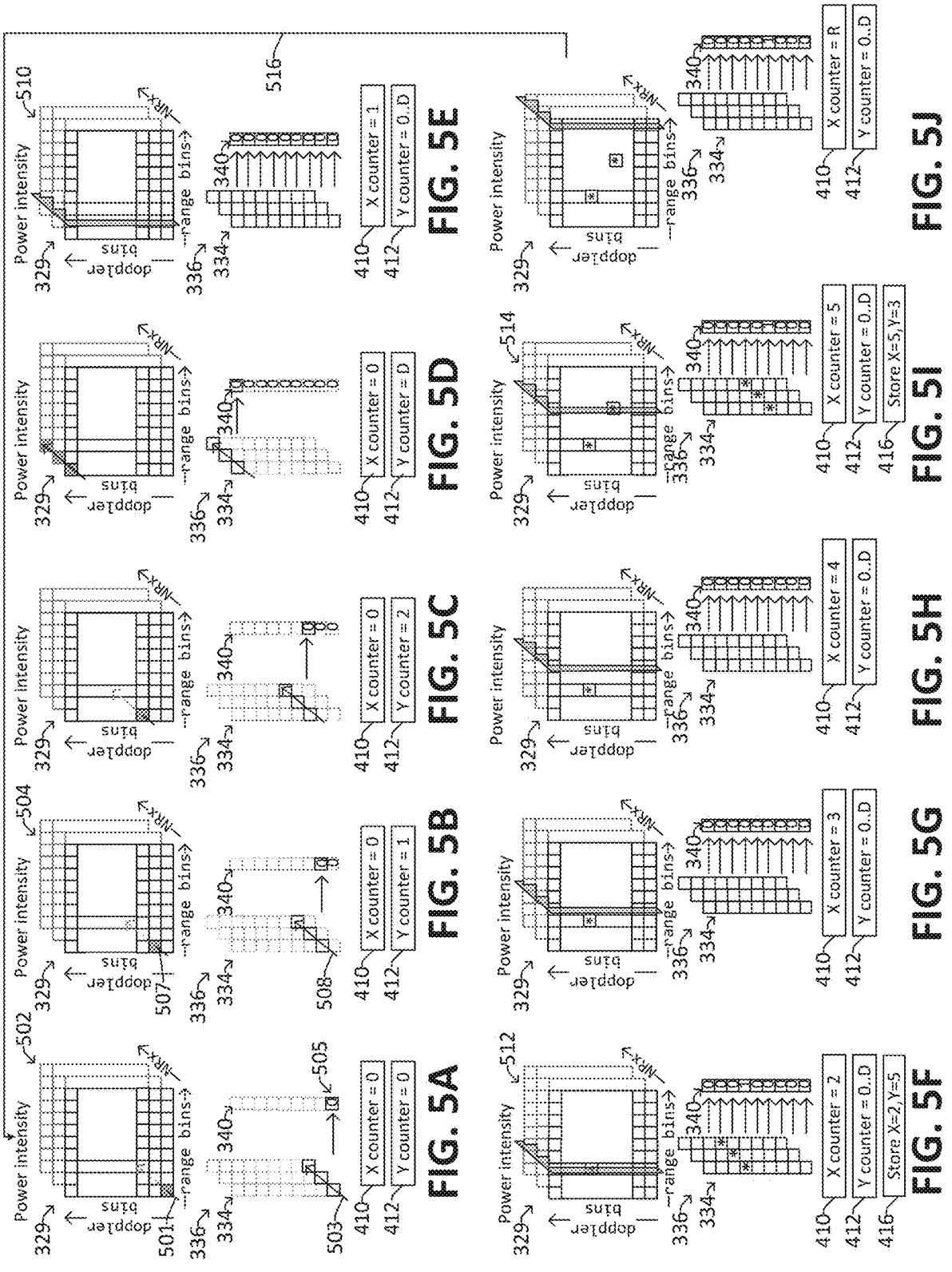

HARDWARE GENERATION OF 3D DMA CONFIGURATIONS

FIELD

The present disclosure relates in general to electronic systems such as radar systems, and more particularly, to radar systems that utilize Doppler division multiplexing in frequency modulated continuous wave radar.

BACKGROUND

Radar (RAdio Detection And Ranging) systems use radio waves to determine the location and/or velocity of objects in a field. Historically, radar has been used to detect aircraft, ships, spacecraft, guided missiles, and terrain, among others. In more recent times, radar has also been used to study and/or predict weather formations, and has been used in collision-detection and/or collision-avoidance in motor vehicles. A radar system includes a transmitter to produce electromagnetic waves in the radio or microwave domain, a receiver to receive those waves after they bounce back from one or more objects in a field, and a processor to determine properties of the objects. The electromagnetic waves from the transmitter can be pulsed or continuous, and reflect off the object and return to the receiver, giving information about the object's location and/or velocity relative to the radar system.

BRIEF DESCRIPTION OF THE DRAWINGS

FIGS. 5A-5J illustrate a series parallel processing operations whereby a first stream of complex numbers from a Fast Fourier transform (FFT) circuit is stored in a memory and concurrently processed by a detection circuit to generate a second stream of bits provided to a DMA.

DETAILED DESCRIPTION

Figures 1, 2:
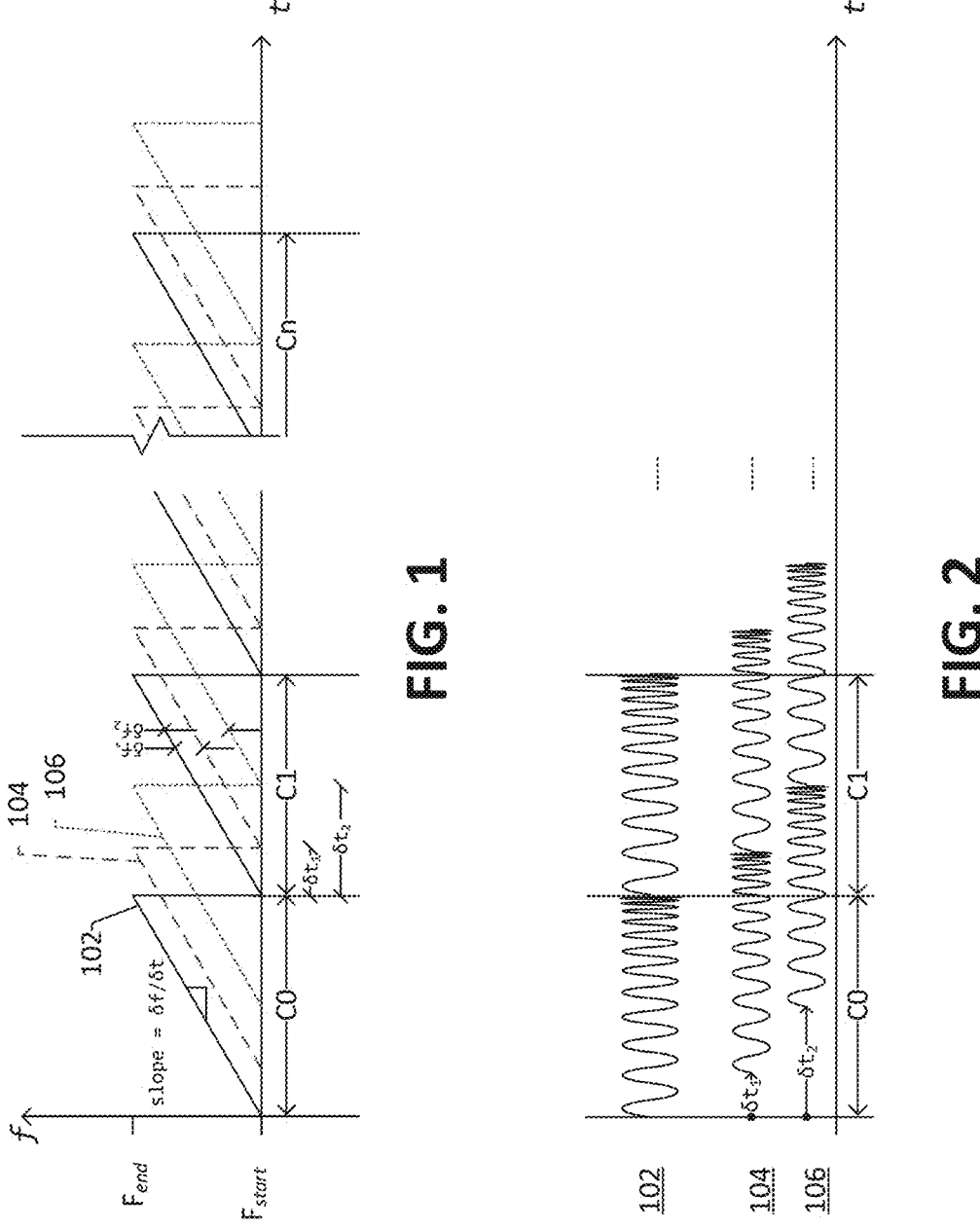
FIG. 1 illustrates a transmitted waveform and received waveforms used in a frequency modulated continuous wave (FMCW) radar system.
FIG. 2 illustrates a transmitted pulse and received pulses used in a FMCW radar system.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware.

Conventional radar systems include an analog front end implemented in hardware to provide a digital radar signal, and a baseband process running software to analyze that digital radar signal. Some aspects of the present disclosure lie in the appreciation that although such software is flexible, it runs more slowly than optimal, particularly for modern radar systems, such as in automotive radar systems. Therefore, to improve processing speed, baseband processors in accordance with this disclosure include one or more fast Fourier transform (FFT) circuits that store FFT results in a memory. A direct memory access (DMA) circuit and detection circuit then read the FFT results from the memory and process those FFT results to provide object detection that runs faster than software solutions. By reducing software overhead, the DMA and detection circuit streamline processing and improve performance of the radar systems compared to other approaches that utilize software for object detection.

Radar systems transmit electromagnetic waves in the form of discrete pulses or continuous waves, and then listen for received pulses (or echoes) to determine the location and/or velocities of objects in a field. For example, FIG. 1 shows an example of a simple transmitted waveform 102 transmitted by a frequency modulated continuous wave (FMCW) radar system, and two received waveforms (or echoes) 104, 106 that reflect back from various objects in the field. It will be appreciated that these waveforms are merely non-limiting examples, and actual waveforms can take any number of forms.

The transmitted waveform 102 includes a series of ramps or chirps, which are transmitted so as to be repeated at regularly spaced time windows C0, C1, C2, . . . , Cn. FIG. 1 shows the instantaneous frequency of the chirps versus time, while FIG. 2 shows the corresponding modulated voltage signals of the chirps as they are transmitted in the corresponding time windows C0, C1, . . . . Each ramp starts at the beginning of a given time window at a start frequency $F_{start}$ and ramps up or down to an end frequency $F_{end}$ at the end of the given time window. Ideally, each ramp has a constant slope during that time window, which provides a link between time delay, beat frequency, and range for various objects in the FMCW radar system. In actual implementations, the slope may not be perfectly constant and may vary slightly in time.

The received waveforms 104, 106 or "echoes" are in response to the transmitted waveform 102. The received waveforms 104, 106 are time delayed copies of the transmitted waveform 102 and also carry a Doppler component due to the relative velocity of the object from which they reflect. Thus, for example, in FIG. 1 and FIG. 2, the first received waveform 104 is reflected from a first object at range 1 and is delayed relative to the transmitted pulse by a first delay, $\delta t1$ for the first time window C0. Similarly, the second received waveform 106 is reflected from a second object at range 2 and delayed relative to the transmitted waveform 102 by a second delay, $\delta t2$ for the first time window C0. Because these time delays $\delta t1$, $\delta t2$ represent the roundtrip delay from the transceiver to the first and second objects in the field, these time delays form the basis of determining the first and second ranges to the first and second objects, respectively. Further, for later time windows, if the first object is moving, the delay between the transmitted waveform 102 and the first received waveform 104 may change slightly (relative to the first delay, $\delta t1$), and this can evidence the velocity of the first object. Note that, relative to the duration of a given time window, the lengths of the first and second time delays $\delta t1$, $\delta t2$ are exaggerated in FIG. 1 and FIG. 2 for purposes of clarity of understanding.

Figure 3:
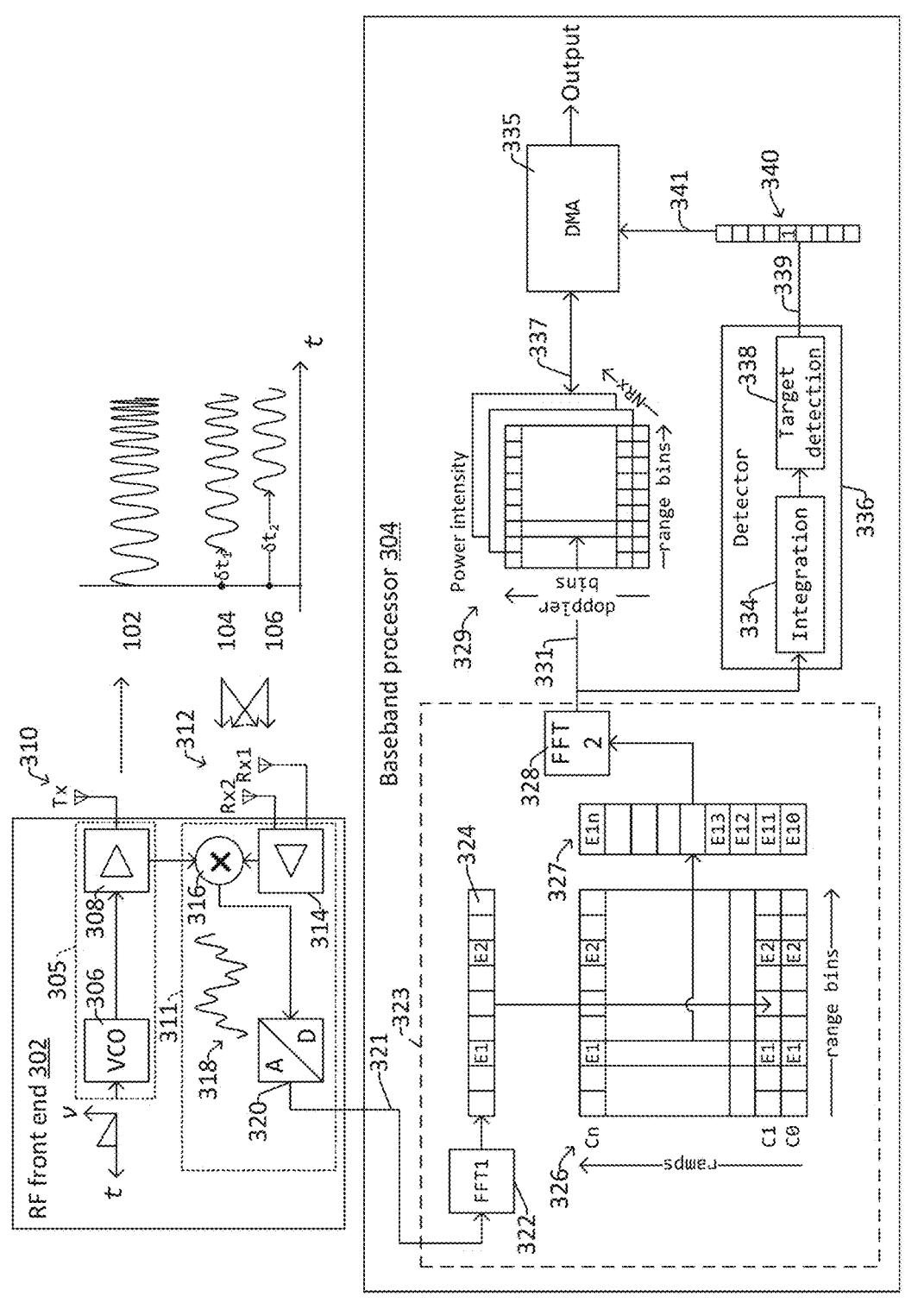
FIG. 3 illustrates a FMCW radar system, including a Direct Memory Access (DMA) hardware module.

FIG. 3 illustrates a FMCW radar transceiver 300 in accordance with some embodiments, and which can make use of FMCW waveforms such as described in FIGS. 1-2. The transceiver 300 includes a radio frequency (RF) front end 302 and a baseband processor 304 downstream of the RF front end 302. The RF front end 302 includes a transmission path 305 and a reception path 311. The transmission path 305 includes a voltage controlled oscillator (VCO) 306, and a transmission amplifier 308, and is coupled to a transmission Tx 310. The reception path 311 is coupled to Nrx reception antennae 312 (Nrx=any positive integer), and includes a reception amplifier 314, a mixer 316, and an analog-to-digital converter (ADC) 320. The reception antennae 312 are typically spaced apart at equal distances from one another.

During operation, the transmission path 305 generates a transmitted waveform 102 using the VCO 306. In the illustrated example, the transmitted waveform 102 has a frequency that ramps in time for n ramps transmitted in n time windows, respectively. The transmitted waveform 102 is achieved by performing a frequency modulation of a carrier frequency, Fc, such that the instantaneous frequency of the transmitted waveform 102 varies from $f_{start}$ to $f_{end}$. The transmitter transmits the waveform 102 using the transmission amplifier 308 and transmission antenna Tx 310.

The received waveforms or "echoes" (e.g., 104 and 106) are received by the reception antennae 312 and the reception amplifier 314. Because each object in the field generates a different echo, each reception antenna 312 sees a superposition of all received waveforms. The mixer 316 mixes the transmitted waveform 102 and the received waveforms 104, 106 and thereby multiplies these waveforms together to provide a mixed signal 318. This mixed signal 318 includes a beat frequency, which is a mixture of the frequencies of the received waveforms (e.g., $\delta f1$ and $\delta f2$). Thus, this beat frequency corresponds to time delays for the various objects, and wherein these time delays correspond to the ranges to the various objects, respectively. The beat frequency is much less than the carrier frequency, Fc; or the central frequency of the sweep. The beat frequency is then sampled by the ADC 320 to generate a digital radar signal 321.

In the baseband processor 304, a signal processing unit 323 includes FFT circuitry to perform a first FFT 322 and a second FFT 328. In some embodiments, the first FFT 322 and second FFT 328 correspond to separate FFT circuit instantiations arranged in series on an integrated circuit. In other embodiments, however, the first FFT 322 and second FFT 328 can be a single FFT circuit with surrounding circuitry to re-route data through the single FFT circuit multiple times to achieve the data processing illustrated in FIG. 3. In either case, the result is that a first fast Fourier transform (FFT)—or Range FFT 322—is initially performed on the digital radar signal 321. The Range FFT 322 separates the individual beat frequencies in the digital radar signal 321, which directly leads to a first FFT result 324 with a number of range bins, with each range bin corresponding to a different range of ranges/distances in which objects can be found. This FFT process is repeated over every ramp of n ramps (e.g., from ramp C0 . . . to ramp Cn), and the FFT results are stored in a first memory 326 for each of n ramps. When all the n ramps are complete, a block of data representing the full field range data is stored in the first memory 326. The results in each range bin (e.g., @E1 range bin 327, which includes a range value for Range E1 for each of the n ramps) may look similar for the various frequency ramps in that range bin, but, since the individual ramps C0, C1, . . ., Cn are separated in time, the samples in a given range bin carry a subtle phase difference induced by the Doppler shift of the various objects (e.g., a time delay due to a slight change in range for an object caused by the object moving by distance v*t, where v is the velocity of the object and t is time).

To recover Doppler information (e.g., velocity information about each object), a second FFT 328—or "Doppler FFT"—is performed on the co-located bins (represents the corner turn or transpose operation) from all ramps. The Doppler information is series of complex numbers, each representing the magnitude (amplitude) and phase of the received radar signal at a respective range and Doppler coordinate pair. The Doppler information is output as first bit stream 331 and is stored in a memory 329. Note that in preferred embodiments the data is not simply a two-dimensional range-Doppler map but has a third dimension and may thus be thought of as a 3D radar cube having Range axis, Doppler axis, and a receive antennae axis (Nrx). Thus, the 3D radar cube stored in memory 329 includes received powers from various objects in a field, and can be plotted according to range bins, Doppler bins; and NRx receive antennas.

Conventional approaches process the complex numbers stored in the memory 329 after the radar data cube is fully output into the memory by using software executing on a processor. However, aspects of the present disclosure lie in the appreciation that although such software is flexible, it runs more slowly than optimal, particularly for modern radar systems, such as in automotive radar systems. Moreover, it is necessary to store the complete radar data cube before processing can start.

To improve processing speed, the baseband processor 304 includes a first processing path 330 having a first processing path input and a first processing path output, as well as a second processing path 332 arranged in parallel with the first processing path 330. A first bus 331 couples the output of the second FFT 328 to the memory 329, and a second bus 337 couples the memory 329 to the Direct Memory Access (DMA) 335.

The second processing path 332 includes a detection circuit 336 having a detection circuit input coupled to the FFT output and having a detection circuit output coupled to the DMA 335. The detection circuit 336 includes an integration circuit 334 and an object detection circuit 338. Integration circuit 334 combines the data, for example, by averaging or summing a given Doppler and Range bin for the plurality of receive antennae. The object detection circuit 338, which may also be referred to as a comparator in some cases, compares the power levels output by this integration with a threshold value. The detection circuit 336 outputs a second stream of bits on bus 341 with a single bit corresponding to each range-Doppler coordinate indicating whether the respective range-Doppler coordinate has a power level over the threshold and hence which may be relevant for object detection. Bus 341 can be the same physical lines/wires as bus 337 or can be separate lines/wires.

The detection circuit 336 operates in conjunction with the DMA 335 to provide high-speed processing. For example, the detection circuit 336 can perform processing to determine whether the detected power levels in the memory 329 represent a potential object, and can write a logical "1" to memory buffer 340 when an potential object is detected at a given Range/Doppler bin, and can write a logical "0" to memory buffer 340 when no potential object is detected at the given Range/Doppler bin. By reducing software overhead, the DMA 335 and detection circuit 336 streamline processing and improve performance of the transceiver 300 compared to other approaches that utilize software for object detection.

Upon receiving this second bit stream, the DMA 335 sets a DMA extracts from the memory 329 the corresponding complex numbers at and around the range-Doppler coordinates flagged by bits in the second bit stream. In this way the necessary data for subsequent processing and object detection is extracted from the stream and it is not necessary to completely store the complete radar data cube in memory 329 before starting to process the data. Moreover, it is in embodiments not necessary that the memory 329 stores the complete radar data cube: instead it is only necessary that the memory 329 is large enough to allow the DMA to extract the required values.

Thus, in some cases, all the blocks illustrated in the baseband processor 304 of FIG. 3 are included in a single integrated circuit. In other cases the blocks illustrated in the baseband processor 304 are spread among multiple integrated circuits arranged on a printed circuit board, or are disposed on multiple silicon substrates that are stacked in a single package as a 3-dimensional integrated circuit. For instance, the DMA 335 and detection circuit 336 can manifest as a circuit logic (e.g., transistors) arranged between the memory 329 and memory buffer 340. The transistors can include metal oxide semiconductor field effect transistors (MOSFETs), bi-polar junction transistors (BJTs), and/or fin field effect transistors (finFETs), and can be disposed in a silicon substrate. Moreover, the transistors can be connected to one another by copper metal lines and vias in a dielectric structure over the silicon substrate to achieve the functionality described.

Figure 4:
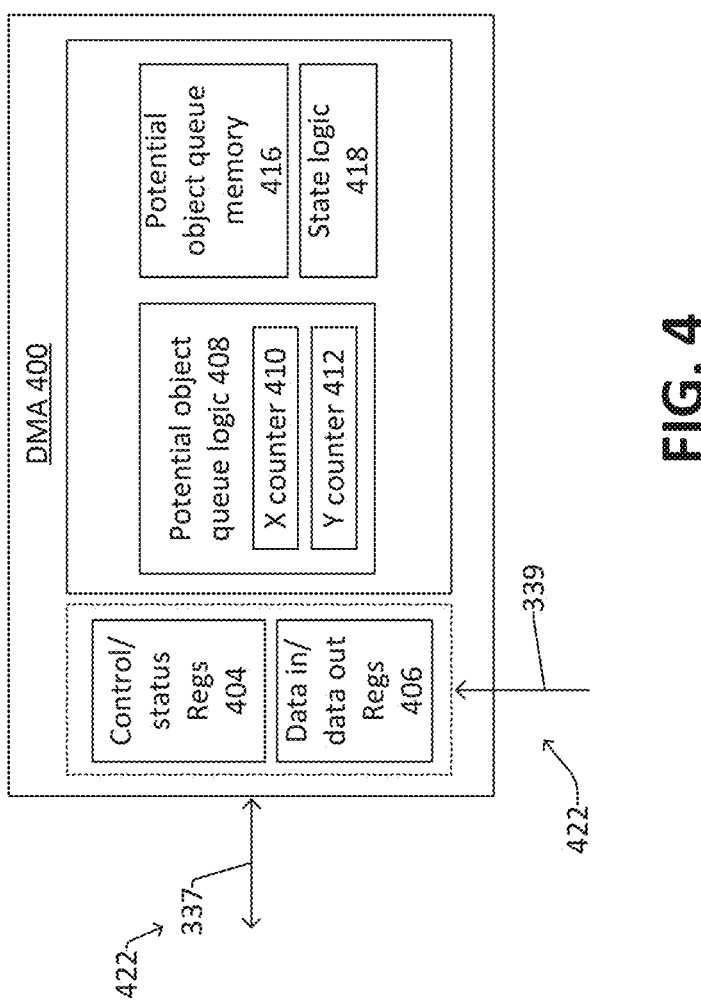
FIG. 4 illustrates a more detailed block diagram of a DMA and some DMA processing.

FIG. 4 shows a more detailed block diagram of a DMA 400 in accordance with some aspects of the disclosure. The DMA 400 includes a memory bus interface 402 (e.g., which connects to bus structure 337 and/or 339 of FIG. 3), including a set of control/status registers 404 and data input/output registers 406. The memory bus interface 402 is coupled to potential object queue logic 408, which includes an X counter 410, and a Y counter 412. A potential object queue memory 416 and state logic 418 are also included in the DMA. The memory bus interface 402 can be coupled to memory 329 and to memory buffer 340 via a bus structure 422 (e.g., bus structure 337 and/or bus structure 339 of FIG. 3).

The bus structure 422 can employ serial data transfer or parallel data transfer, and is implemented as a series of wires on an integrated circuit, typically in a metal interconnect structure comprising metal (e.g., copper) lines stacked over one another and connected by metal (e.g., copper) vias which are disposed over a silicon substrate. For example, the bus structure 422 can typically include a read/write line, a group of address lines, and a group of data lines. In some cases, the data lines can include dedicated input data lines and dedicated output data lines that are separate/distinct from the input data lines, while in other cases the input and output lines can be bi-directional data lines used for transmission of both input data and output data.

FIGS. 5A-5J illustrate an example of how the radar data can be stored in memory 329 and evaluated in parallel by detection circuit 336. Generally, FIGS. 5A-5J illustrate memory 329 and detection circuit 336 as data is processed in time. The memory 329 and detection circuit 336 each store data in memory locations corresponding to bins. For the memory 329, the stored data corresponds to multiple Range bins, multiple Doppler bins, and multiple receive antennas. For the detection circuit 336, the stored data corresponds to a single range bin, multiple Doppler bins, and multiple receive antennas (NRx)—with each bin represented by a box. For ease of understanding, a "*" symbol for a given Range/Doppler bin means that bin has a power intensity that is greater than a threshold value, such that a potential object is present in that Range/Doppler bin. Other Range/Doppler bins with power intensities that are less than the threshold value are left blank, meaning that no potential objects are present in those bins.

In FIG. 5A at a first time 502, memory 329 receives a first data vector (e.g., complex value of a first bit stream 331 of FIG. 3) corresponding to a first range bin (R=0), and first Doppler bin (D=0), and multiple receive antennae (NRx) (see arrow 501). Concurrently, the detection circuit 336 has an integration circuit 334 that receives the first data vector, and performs integration on this data over the multiple receive antennae (NRx) (see arrow 503). For example, the integration circuit 334 can sum the values of the first vector and/or calculate a weighted average for these values, thereby providing an integrated result (e.g., average power intensity). The object detection circuit 338 of the detection circuit 336 can then compare the integrated result to a predetermined threshold, and outputs a bit 505 to memory buffer 340, wherein the value of the bit 505 indicates the result of the comparison. For example, if the sum and/or weighted average is less than or equal to the predetermined threshold, then a "0" can be output; whereas if the sum and/or weighted average is greater than or equal to the predetermined threshold, then a "1" can be output. So at the first time 502, the integrated result is less than the threshold value (as evidenced by a lack of a 1 in the first memory location of memory buffer 340), so nothing is stored in the potential object queue memory 416 of the DMA at this time.

In FIG. 5B at a second time 504, a second data vector 507 is written to memory 329. Concurrently, the integration circuit 334 performs integration on this second data vector over the multiple receive antennae (NRx) (see arrow 508). The object detection circuit 338 of the detection circuit can then compare the second integration result to the predetermined threshold, and outputs a bit 509 whose value indicates the result of the comparison. Again, at the second time 504, the integrated result is less than the threshold value (as evidenced by a lack of a 1 in the second memory location of memory buffer 340), so nothing is stored in the potential object queue memory 416 at this time.

Additional data vectors are processed in FIGS. 5C-5D with integrations and comparisons being performed for each data vector, until the entire first Range bin has been processed, as shown for example in FIG. 5D.

In FIG. 5E at time 510, the second range bin is processed in the same way as the first range bin, with data being written to memory 329 and processed in parallel by detection circuit 336 as Doppler bins are incrementally increased from 0 to D. (Incrementation of the Y counter 412 in the second range bin for each location is not illustrated for simplicity.) Again, in the second Range bin, no potential objects are detected, so no addresses are stored in the potential object queue memory 416.

In FIG. 5F at time 512, the third range bin is processed in the same way. In the third range bin, however, the integration result for the D=5 Doppler bin is greater than the pre-determined threshold, such that a first potential object is now detected at an X, Y coordinate of 2,5. Therefore, the first set of X,Y coordinates are stored in the potential object queue memory 416 of DMA. Similarly, in FIG. 5H at time 514, a second potential object is detected at a second set of X,Y coordinates of 5,3, so this second set of coordinates are also stored in the potential object queue memory 416. This process can continue until all Range/Doppler bins are processed, for instance as shown in FIG. 5J. Even after the entire 3D cube of radar data is processed, the data processing can continue (see arrow 516), such that the memory 329 and detection circuit 336 can continuously monitor the field for changes in distance (range) to objects in the field, as well changes in velocity (Doppler) of those objects.

Figures 6A, 6B:
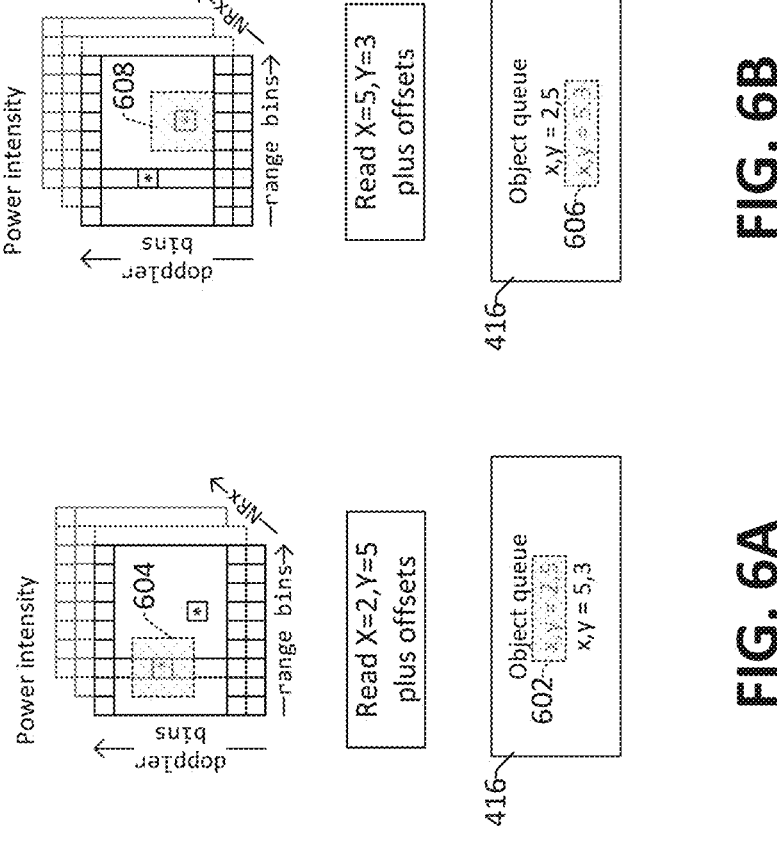
FIGS. 6A-6B illustrate DMA configurations whereby the DMA reads data elements based on information in an object queue provided by detection circuit.

FIGS. 6A-6B follow from the example of FIGS. 5A-5J and illustrate how the DMA (e.g., 335 of FIG. 3 or 400 of FIG. 4) processes data in coordination with the memory 329 and information from the detection circuit 336. In FIG. 6A, the DMA starts with the first set of X, Y coordinates 602, which were determined by the detection circuit 336 and stored in the potential object queue memory 416 (see FIG. 5F). The DMA then sets its configuration based on these X, Y coordinates 602 and includes an offset for the DMA configuration. Here, for example, the first set of X, Y coordinates is 2,5, so the DMA can apply an offset of X–1, Y–1 to set the DMA read configuration, and can then read a first 2D square/polygon 604 of data that is three Doppler bins high and three Range bins wide (and/or can read a 3D square prism, 3D rectangular prism, etc.—e.g., X–1, Y–1, and all Z coordinates). In other examples, other offsets can also be used and/or other lengths/widths for the first square/polygon 604 can be used, and FIG. 6A is merely a non-limiting example for purposes of illustration/explanation. For instance, in more general terms, the DMA read configuration can include an X offset of L, a Y offset of M, and a Z offset of N, wherein L, N, and M are integers and can be the same or different from one another. In some examples, one or more of L, M, and N can range from 1-2, or can range from 1-5, or can range from 1-10, or even 1-100, although any integer can in general be used.

When the DMA has read the complex values for memory locations within the first square/polygon 604, the DMA or other circuit can determine an average or weighted power intensity for the first square/polygon 604, and compares the average or weighted power intensity to the power intensity of the potential object at the first X,Y coordinate 602. This allows the system to discern between actual objects and phantom objects. For example, in FIG. 6A, the power intensity stored at X, Y=2,5 can be greater than the average power intensity over the first square/polygon 604 by more than some predetermined threshold, so the first potential object is confirmed as an actual object.

Similarly, in FIG. 6B, the same process is carried out for a second potential object at a second set of X,Y coordinates 606 (X,Y=5,3) (see also FIG. 5I). Thus, a difference between the power intensity stored at the second set of X, Y coordinates 606 (X,Y=5,3) and the average power intensity over the entire second square/polygon 608 can be less than the predetermined threshold, such that the second potential object is determined to be a phantom object rather than an actual object.

Some examples relate to a baseband processor for radar. The baseband processor includes a fast Fourier transform (FFT) circuit configured to output a first stream of complex numbers representing magnitude and phase at respective range and Doppler coordinate pairs. A memory is coupled to the FFT circuit and is configured to store the first stream of complex numbers as a range-Doppler map. A detection circuit is coupled to the FFT circuit and is configured to output a second stream of bits based on the first stream of complex numbers. The second stream of bits indicate whether a value corresponding to each respective range and Doppler coordinate pair exceeds a threshold value. A Direct Memory Access (DMA) is coupled to the memory and is coupled to the detection circuit. The DMA is configured to generate a DMA read configuration for each bit in the second stream of bits indicating that the value exceeds the threshold value. The DMA is further configured, for each DMA read configuration, to read a plurality of complex numbers from the memory at the range and Doppler coordinate pair corresponding to the respective DMA read configuration.

In some further examples of a baseband processor, the detection circuit is configured to evaluate the value in parallel with the memory storing the first stream of complex numbers.

In some further examples of a baseband processor, the plurality of complex numbers read from the memory by the DMA corresponds to values arranged in a square, a square prism, a rectangle, a rectangular prism, or a polygon, which surrounds the range and Doppler coordinate pair.

In some further examples of a baseband processor, the detection circuit includes: an integration circuit configured to process a data vector corresponding to a range and Doppler coordinate pair and thereby provide an integration result; and an object detection circuit configured to compare the integration result to the threshold value, and to generate a bit in the second stream of bits based on the comparison.

In some further examples of a baseband processor, the DMA includes: a bus interface including control/status registers and data-in/data-out registers; a potential object queue logic coupled to the bus interface; and a potential object queue memory coupled to the potential object queue logic.

Some examples relate to baseband processor for radar. The baseband processor includes a fast Fourier transform (FFT) circuit including an FFT input and an FFT output. A first processing path having a first processing path input and a first processing path output includes a memory coupled to the FFT output and the first processing path input via a first bus. A Direct Memory Access (DMA) is coupled between the memory and the first processing path output. The DMA is coupled to the memory via a second bus. A second processing path is arranged in parallel with the first processing path. The second processing path includes a detection circuit having a detection circuit input coupled to the FFT output and having a detection circuit output coupled to the DMA.

In some further examples of a baseband processor, the detection circuit includes an integration circuit having an integration circuit input and an integration circuit output. The integration circuit input is coupled to the FFT output. The detection circuit also includes an object detection circuit having an object detection circuit input and an object detection circuit output. The object detection circuit input is coupled to the integration circuit output, and the object detection circuit output is coupled to the DMA.

In some further examples of a baseband processor, the detection circuit includes an integration circuit configured to process a data vector corresponding to a range and Doppler coordinate pair and thereby provide an integration result. The detection circuit also includes an object detection circuit configured to compare the integration result to a threshold value, and to generate a bit based on the comparison and provide the bit to the DMA.

In some further examples of a baseband processor, the DMA includes a memory bus interface including control/status registers and data-in/data-out registers coupled to the second bus. The DMA also includes a potential object queue logic coupled to the memory bus interface; and a potential object queue memory coupled to the potential object queue logic.

In some further examples of a baseband processor, the FFT circuit is configured to output a first stream of complex numbers representing magnitude and phase at respective range and Doppler coordinate pairs. The memory is configured to receive via the first bus the first stream of complex numbers as a range-Doppler map. The detection circuit is configured to process the first stream of complex numbers in parallel with the memory receiving the first stream of complex numbers.

In some further examples of a baseband processor, the detection circuit is further configured to output a second stream of bits to the DMA based on the first stream of complex numbers. The second stream of bits indicates whether a value corresponding to each respective range and Doppler coordinate pair exceeds a threshold value.

In some further examples of a baseband processor, the DMA is configured to generate a DMA read configuration for each bit in the second stream of bits indicating that the value exceeds the threshold value. The DMA is further configured, for each DMA read configuration, to read a plurality of complex numbers from the memory over the second bus at the range and Doppler coordinates corresponding to the respective DMA read configuration.

In some further examples of a baseband processor, the detection circuit is configured to evaluate a data vector provided by the FFT circuit in parallel with the data vector being stored in the memory.

In some further examples of a baseband processor, the FFT circuit, the first processing path, and the second processing path are disposed on a single integrated circuit.

Some examples relate to a radar system. The radar system includes a radio frequency (RF) front end including a plurality of radar receive antennas, and an analog-to-digital converter to provide radar data. A signal processing unit is coupled the analog-to-digital converter. The signal processing unit is configured to perform a first fast Fourier transform (FFT) on the radar data to provide a first FFT result; and is further configured to perform a second FFT based on the first FFT result to thereby provide a second FFT result. A memory is coupled to the signal processing unit and is configured to store the second FFT result. A detection circuit is configured to output a second stream of bits based on the second FFT result, where individual bits in the second stream of bits indicate whether a value corresponding to a range and Doppler coordinate pair in the second FFT result exceeds a threshold value. A Direct Memory Access (DMA) is coupled to the memory and is coupled to the detection circuit. The DMA is configured to generate a DMA read configuration for each bit in the second stream of bits indicating that the value exceeds the threshold value. The DMA is further configured, for each DMA read configuration, to read a plurality of values from the memory at the range and Doppler coordinate pair corresponding to the respective DMA read configuration.

In some examples of the radar system, the plurality of values read from the memory by the DMA corresponds to a square, a square prism, a rectangle, a rectangular prism, or a polygon, which surrounds the range and Doppler coordinate pair.

In some examples of the radar system, the plurality of values read from the memory by the DMA include an X-offset of L, a Y-offset of M, and a Z-offset of N, wherein L, M, and N are integers, such that the plurality of values read from the memory by the DMA surround the Doppler coordinate pair.

In some examples of the radar system, the DMA comprises: a bus interface including control/status registers and data-in/data-out registers; a potential object queue logic coupled to the bus interface; a potential object queue memory coupled to the potential object queue logic; and a constant false alarm rate detector coupled to the bus interface.

In some examples of the radar system, the detection circuit is configured to evaluate the value in parallel with the storing of the second FFT result in the memory.

In some examples of the radar system, the radar system is a frequency mode continuous wave (FMCW) radar system.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

What is claimed is:

1. A baseband processor for radar, comprising
a fast Fourier transform (FFT) circuit configured to output
    a first stream of complex numbers representing magnitude and phase at respective range and Doppler coordinate pairs;
a memory coupled to an output of the FFT circuit and
    configured to store the first stream of complex numbers as a range-Doppler data cube;
a detection circuit coupled to the output of the FFT circuit
    and configured to, in parallel with the storing of the range-Doppler data cube
    receive the first stream of complex numbers from the FFT circuit, and
    output a second stream of bits indicating whether a value in the first stream of complex numbers exceeds a threshold value; and
a Direct Memory Access (DMA) coupled to the memory
    and coupled to the detection circuit, the DMA configured to
    receive the second stream of bits,
    generate a DMA read configuration for each bit in the second stream of bits indicating that the value exceeds the threshold value, the read configuration indicating a range and Doppler coordinate pair in the range-Doppler data cube that stores the value, and for each DMA read configuration, to read a plurality of complex numbers from the range-Doppler data cube, wherein the plurality of complex numbers includes the complex number stored in the range-Doppler data cube at the range and Doppler coordinate pair indicated by the DMA read configuration.

2. The baseband processor of claim 1, wherein the DMA is configured to read the plurality of complex numbers read from the memory based on one or more offset values, the offset values defining, within the range-Doppler data cube, a square, a square prism, a rectangle, a rectangular prism, or a polygon, which surrounds the range and Doppler coordinate pair.

3. The baseband processor of claim 1, wherein the detection circuit comprises:
an integration circuit configured to process a data vector corresponding to a plurality of complex numbers having the same range and Doppler coordinate pair and different receive antenna coordinates and thereby provide an integration result; and
an object detection circuit configured to compare the integration result to the threshold value, and to generate a bit in the second stream of bits based on the comparison.

4. The baseband processor of claim 1, wherein the DMA comprises:
a bus interface including control/status registers and data-in/data-out registers;
a potential object queue logic coupled to the bus interface; and
a potential object queue memory coupled to the potential object queue logic.

5. A baseband processor for radar, comprising
a fast Fourier transform (FFT) circuit including an FFT input and an FFT output;
a first processing path having a first processing path input and a first processing path output, the first processing path including a memory coupled to the FFT output and the first processing path input via a first bus, and a Direct Memory Access (DMA) coupled between the memory and the first processing path output, the DMA coupled to the memory via a second bus, wherein the memory is configured to store the FFT output as a range-Doppler data cube; and
a second processing path arranged in parallel with the first processing path, the second processing path including a detection circuit having a detection circuit input coupled to the FFT output and having a detection circuit output coupled to the DMA, the detection circuit configured to, in parallel with the storing of the FFT output as a range-Doppler data cube, receive the FFT output from the FFT circuit and output, to the DMA, a stream of bits indicating whether a value in the FFT output exceeds a threshold value;
wherein the DMA is configured to
generate a DMA read configuration for each bit in the second stream of bits indicating that the value exceeds the threshold value, the read configuration indicating a range and Doppler coordinate pair in the range-Doppler data cube that stores the value, and
for each DMA read configuration, read a plurality of values from the range-Doppler data cube, wherein the plurality of values includes the value stored in the range-Doppler data cube at the range and Doppler coordinate pair indicated by the DMA read configuration.

6. The baseband processor of claim 5, wherein the detection circuit comprises:
an integration circuit having an integration circuit input and an integration circuit output, the integration circuit input coupled to the FFT output; and
an object detection circuit having an object detection circuit input and an object detection circuit output, the object detection circuit input coupled to the integration circuit output, and the object detection circuit output coupled to the DMA.

7. The baseband processor of claim 5, wherein the detection circuit comprises:
an integration circuit configured to process a data vector corresponding to a plurality of complex numbers having the same range and Doppler coordinate pair and different receive antenna coordinates and thereby provide an integration result; and
an object detection circuit configured to compare the integration result to a threshold value, and to generate a bit based on the comparison and provide the bit to the DMA.

8. The baseband processor of claim 5, wherein the DMA comprises:
a memory bus interface including control/status registers and data-in/data-out registers coupled to the second bus;
a potential object queue logic coupled to the memory bus interface; and
a potential object queue memory coupled to the potential object queue logic.

9. The baseband processor of claim 5:
wherein the FFT output comprises a first stream of complex numbers representing magnitude and phase at respective range and Doppler coordinate pairs; and
wherein the memory is configured to receive via the first bus the first stream of complex numbers as the range-Doppler data cube.

10. The baseband processor of claim 5, wherein the FFT circuit, the first processing path, and the second processing path are disposed on a single integrated circuit.

11. A radar system, comprising:
a radio frequency (RF) front end including a plurality of radar receive antennas, and an analog-to-digital converter to provide radar data;
a signal processing unit coupled to the analog-to-digital converter, the signal processing unit configured to perform a first fast Fourier transform (FFT) on the radar data to provide a first FFT result; and further configured to perform a second FFT based on the first FFT result to thereby provide a second FFT result;
a memory coupled to the signal processing unit and configured to store the second FFT result as a range-Doppler data cube;
a detection circuit configured to receive the second FFT result from the signal processing unit, and output a second stream of bits based on the second FFT result, where individual bits in the second stream of bits indicate whether a value corresponding to a range and Doppler coordinate pair in the second FFT result exceeds a threshold value; and
a Direct Memory Access (DMA) coupled to the memory and coupled to the detection circuit, the DMA configured to
generate a DMA read configuration for each bit in the second stream of bits indicating that the value exceeds the threshold value, the read configuration indicating a range and Doppler coordinate pair in the range-Doppler data cube that stores the value, and for each DMA read configuration, to read a plurality of values from the range-Doppler data cube, wherein the plurality of values includes the value stored in the range-Doppler data cube at the range and Doppler coordinate pair indicated by the DMA read configuration.

12. The radar system of claim 11, wherein the DMA is configured to read the plurality of values from the memory based on one or more offset values, the offset values defining, within the range-Doppler data cube, a square, a square prism, a rectangle, a rectangular prism, or a polygon, which surrounds the range and Doppler coordinate pair.

13. The radar system of claim 11, wherein the DMA comprises:

a bus interface including control/status registers and data-in/data-out registers;

a potential object queue logic coupled to the bus interface;

a potential object queue memory coupled to the potential object queue logic; and a constant false alarm rate detector coupled to the bus interface.

14. The radar system of claim 11, wherein the radar system is a frequency modulated continuous wave (FMCW) radar system.

15. The baseband processor of claim 1, wherein the DMA is configured to determine an average power intensity of the plurality of complex numbers;

compare the average power intensity with a power intensity of the complex number stored in the range and Doppler coordinate pair indicated by the DMA read configuration; and identify the complex number as corresponding to an object when the power intensity exceeds the average power intensity by more than a threshold.

* * * * *